United States Patent [19]
Faust et al.

[11] Patent Number: 5,665,837
[45] Date of Patent: Sep. 9, 1997

[54] INITIATION VIA HALOBORATION IN LIVING CATIONIC POLYMERIZATION

[75] Inventors: Rudolf Faust, Lexington; Lajos Balogh, Chelmsford, both of Mass.

[73] Assignee: University of Massachusetts Lowell, Lowell, Mass.

[21] Appl. No.: 173,493

[22] Filed: Dec. 23, 1993

[51] Int. Cl.$^6$ .................................................. C08F 4/14
[52] U.S. Cl. .......................... 526/237; 526/183; 526/189; 526/204; 526/217; 526/239; 526/346; 526/348; 526/348.6; 526/348.7
[58] Field of Search .............................. 526/348.7, 237, 526/204, 239, 346

[56] References Cited

U.S. PATENT DOCUMENTS

| | | | |
|---|---|---|---|
| 3,963,772 | 6/1976 | Takeshita . | |
| 4,276,394 | 6/1981 | Kennedy | 525/245 |
| 4,568,732 | 2/1986 | Kennedy et al. | 526/206 |
| 4,611,037 | 9/1986 | Musch et al. | 426/135 |
| 4,910,321 | 3/1990 | Kennedy et al. | 549/213 |
| 4,929,683 | 5/1990 | Kennedy et al. | 525/268 |
| 4,946,899 | 8/1990 | Kennedy et al. | 525/244 |
| 5,247,023 | 9/1993 | Chung et al. | 525/288 |

FOREIGN PATENT DOCUMENTS

| | | |
|---|---|---|
| 0206756 | 12/1986 | European Pat. Off. . |
| 600317 | 4/1948 | United Kingdom . |
| 2183243 | 6/1987 | United Kingdom . |

OTHER PUBLICATIONS

L. Bul et al., "A Possible Direct Initiation of Cationic Polymerization of Isobutylene by Boron Trichloride in Methylene Chloride", *Polymer Bulletin*, 17:157–162 (1987).

F. R. Khalafov, et al., "Cationic Polymerization of Isobutylene Initiated by Friedel–Crafts Catalysts 1, The Role of Sterically Hindered Pyridine in the Initiation Reaction", *Makromol. Chem. Rapid Commun.*, 6:29–33 (1985).

J. M. Moulis et al., "The Use of 2,6–Di–tert–Butyl–4–Methylpyridine to Distinguish Between Different Modes of Initiation in Cationic Polymerisation", *Polymer Bulletin*, 3:197–202 (1980).

A. Gandini and A. Martinez, "The Role of Sterically–Hindered Pyridines in Cationic Polymerization", *Makromol. Chem., Macromol. Symp.*, 13/14:211–234 (1988).

D. W. Grattan and Peter H. Plesch, "The Initiation of Polymersations by Aluminium Halides", *Makromol. Chem.*, 181:751–775 (1980).

G. Sauvet et al., "The Cationic Dimerization of 1,1–Diphenylethylene. II. Cation Formation with Titanium Tetrachloride in Dichloromethane Solution", *Journal of Polymer Science: Polymer Chemistry Edition* 16:3047–3064 (1978).

G. Odian, "Principles of Polymerization" 3rd Ed., 390–392 (1991) Wiley (New York).

Balogh, Lajos and Faust, Rudolf, "Living Carbocationic Polymerization of Isobutylene with BCl$_3$ Coinitiation in the Presence of di–tert–butylpyridine as Proton Trap," *Polymer Bulletin*, 28(4):367–374 (1992).

*Primary Examiner*—Fred Zitomer
*Attorney, Agent, or Firm*—Hamilton, Brook, Smith & Reynolds, P.C.

[57] ABSTRACT

A composition of the invention includes a polymer component which consists essentially of an asymmetric telechelic polymer having a boron-containing head group. These asymmetric telechelic polymers can also have halogen tail groups. The end group functionalities make these polymers extremely useful because, for example, the functionalities facilitate subsequent elaboration of the polymer. A method of forming the composition includes forming a reaction mixture which consists essentially of an olefin, a Lewis acid, and a base which will react with essentially all protic impurities in the reaction mixture, thereby preventing protic initiation during polymerization of the olefin. The reaction mixture is exposed to conditions which cause the olefin to react to form an initiator in situ which can cause polymerization of additional olefin to form a polymerized olefin consisting essentially of a telechelic polymer. In another embodiment, the initiator has the structure $BX_2$—$[CH_2$—$C(CH_3)_2]_n A$, where "n" is at least one, "X" is a halogen, and "A" is a leaving group.

28 Claims, No Drawings

INITIATION VIA HALOBORATION IN LIVING CATIONIC POLYMERIZATION

BACKGROUND OF THE INVENTION

Polymers are formed from a wide variety of organic compounds. Further, they are employed in many commercial application's, some of which have very specific requirements. For example, some uses demand polymer materials of extremely high purity, or within a narrow molecular weight range. Other applications, such as many industrial uses, employ polymers as reactants for further conversion to compositions having particular mechanical properties.

However, polymerization reactions typically are difficult to control. Even at constant reaction conditions, resulting polymers commonly have broad ranges of molecular weight. Further, during polymerization, polymer chains can undergo chain transfer and side reactions. These polymer products consequently have a molecular structure which can allow the physical properties of the material to be manipulated, such as by application of heat, or by mechanical force, but which limit the potential of the polymer as a reactant for production of related compounds.

One attempt to control the molecular weight ranges and molecular structure of polymers has been to employ living polymerizations. These are polymerizations which include propogation reactions and proceed with the absence of termination and chain transfer. As a consequence, living polymerizations generally yield polymers with well defined structure, controlled molecular weight, and narrow molecular weight distribution.

However, polymers formed by known methods of carbocationic living polymerization generally require several additional steps of chemical processing before they are suitable as reactants in production of specialty chemicals. For example, telechelic polymers which include at least one boron-containing end group are commonly employed as reactants because the boron component can make the end-groups the preferred functional group in subsequent reactions. However, polymers formed by living polymerization must go through several reaction steps following polymerization in order to obtain a polymer composition which includes the boron-containing end group. The additional reaction steps can significantly reduce reactant quality and can deleteriously affect ultimate product yield.

Therefore, a need exists for a polymer composition and a method of forming such polymer compositions which reduce or eliminate the above-mentioned problems.

SUMMARY OF THE INVENTION

The present invention relates to a composition having a polymer component which consists essentially of an asymmetric telechelic polymer having a boron-containing head group, and to a method of forming the composition.

The method includes forming a reaction mixture consisting essentially of a polar solvent, an olefin, a Lewis acid, and a base, the base being present in at least on equal stoichiometric amount to any protic acid impurity in the reaction mixture, whereby protic initiation during polymerization of the olefin is essentially prevented. The reaction mixture is exposed to conditions which cause the olefin to polymerize, thereby forming the asymmetric telechelic polymer.

In another embodiment, the invention relates to a composition having a polymer component which consists essentially of a telechelic polymer including at least one boron-containing end group having a structural formula of:

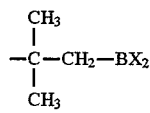

wherein X is, for example, a halogen, a hydroxy group or a methoxy group.

Also, the invention relates to a method of forming a symmetric telechelic polymer. The method includes combining the asymmetric telechelic polymer of the invention with a coupling agent. The combined coupling agent and polymer are exposed to conditions which cause coupling of the polymer, thereby forming the symmetric telechelic polymer.

In still another embodiment, the invention relates to an initiator for living polymerization of isobutylene having the structure of:

$BX_2-[CH_2-C(CH_3)_2]_n A$ where "n" is at least one, "X" is a halogen, and "A" is a leaving group.

The present invention has many advantages. For example, the method causes a living polymerization of an olefin monomer that forms a telechelic polymer having a controlled molecular weight and a narrow molecular weight distribution. The telechelic polymer has a boron-containing functional head group. Therefore, the product of the living polymerization can be employed as a reactant for a wide variety of products without requiring intervening process steps to form a boron-containing end group. Further, the living polymerization forms a telechelic polymer which is asymmetric, having a boron-containing functional group attached at only one end of the polymer. However, the asymmetric telechelic polymers can be coupled to form symmetric telechelic polymers which have boron-containing head and tail groups, thereby greatly increasing the variety of applications for which the products formed by the method of the invention are suitable.

DETAILED DESCRIPTION OF THE INVENTION

The features and other details of the invention will now be more particularly described with reference to the accompanying tables and pointed out in the claims. It will be understood that the particular embodiments of the invention are shown by way of illustration and not as limitations of the invention. The principal features of this invention can be employed in various embodiments without departing from the scope of the invention.

This invention relates to a composition having a polymer component which consists essentially of a telechelic polymer having a boron containing head group. The composition can be composed entirely of the polymer component, or it can be composed of more than one component. Furthermore, the polymer component is understood to contain all the polymer molecules in the composition. As defined herein, a "telechelic polymer" means a linear polymer that is substituted with functional groups at both ends. A telechelic polymer in which these functional substituents are different is "asymmetric," while a "symmetric" telechelic polymer is one with identical substituents at both ends. Embodiments of the present invention include both symmetric and asymmetric telechelic polymers.

A "head group" is a substituent at an end of the telechelic polymer corresponding to the monomer component at which the polymerization was initiated. In a similar fashion, a "tail group" is a substituent at an end of the telechelic polymer corresponding to the monomer component at which the polymerization was terminated. A head or tail group of a telechelic polymer may also be referred to as an end group.

The method of forming the asymmetric telechelic polymer of the invention includes forming a suitable reaction mixture which includes a polar solvent, a base, an olefin, and a Lewis acid. The base should be added before either the Lewis acid or the olefin. Further, the solvent preferably is not the last component added. However, the order in which the olefin and Lewis acid are added can be reversed.

A polar solvent, as defined herein, is a solvent or a solvent mixture which includes at least one component having at least one electron-withdrawing group. Examples of suitable polar solvents are those having a hydrocarbon component with at least one halogenated carbon. Preferred halogens are bromine and chlorine. Particularly preferred polar solvents include methyl chloride, methylene chloride and 1,2-dichloroethane.

The base component of the reaction mixture is suitable for reaction with protic impurities, such as water, and which is substantially inert with respect to the polymer. Examples of bases include 2,6-di-tert-butylpyridine or 2,6-di-tert-butyl-4-methylpyridine. The amount of the base is at least equal to the stoichiometric amount of any protic acid impurity in the reaction mixture. It is believed that the base prevents protic initiation by the impurity during polymerization of the olefin. Preferably, the base is in stoichiometric excess to any protic impurity present.

Suitable olefin monomer components of the reaction mixture are those which can be polymerized by cationic polymerization. Examples of specific olefin monomers include C4 to C9 aliphatic olefins or substituted or unsubstituted vinyl or vinylidene aromatic compounds. Aliphatic olefins can optionally include substituted or unsubstituted aromatic moieties and heteroatom substituents which do not significantly interfere with the polymerization. These olefinic monomers can also include C4 to C14 multiolefins, such as isoprene. Particularly preferred olefins include styrene and isobutylene.

Examples of suitable Lewis acids include $BF_3$, $BCl_{13}$, $BBr_3$, mixtures thereof or with Lewis acids that do not contain boron. A suitable mixture is one which includes $BCl_3$ and $TiCl_4$. Preferred Lewis acids are $BBr_3$ and $BCl_3$. The Lewis acids are used in concentrations sufficient to cause polymerization. In one embodiment, the concentration of the Lewis acid in the reaction mixture is in a range of between about 0.03 molar and 3.0 molar. Preferably, the concentration of Lewis acid in the reaction mixture is in a range of between about 0.1 and 1.0 molar.

The reaction mixture is exposed to conditions which cause the olefin monomer component to react to form an initiator in situ, whereby additional olefin monomer is polymerized to form an asymmetric telechelic polymer having a boron-containing head group. In one embodiment, suitable conditions include a temperature range of between about −100° C. and 10° C. Preferably, the temperature is in a range of between about −80° C. and 0° C. In a particularly preferred embodiment, the temperature is in a range of between about −50° C. and −20° C. Typically, the reaction period is sufficient to form a composition which includes a polymer component which consists essentially of an asymmetric telechelic polymer having a boron-containing head group. Typically, the reaction period ranges from between about one minute and thirty hours, depending on the specific reagents used. Preferably, the reaction mixture is agitated, such as by employing conventional mixing means.

The initiator is produced in situ by haloboration of an olefin monomer. The length of the initiator is then incrementally increased by olefin monomer subunits as polymerization of the olefin proceeds. For example, polymerization of isobutylene by the method of the invention produces an initiator having the following structural formula:

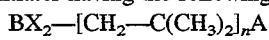

In the above structural formula, "X" is a halogen, "n" is greater than or equal to 1, and "A" is a leaving group. As defined herein, a leaving group is a noncarbon-containing moiety that is formed by cleavage of a bond between a carbon and a suitable heteroatom. "A" is preferably a halogen and, most preferably, chlorine or bromine.

A feature of the sequential addition of monomer units to the tail group of the initiator of this invention is that it allows for control of the end groups of the resulting polymer component of the composition formed. As can be seen from the structure of the initiator formed in situ, polymerization of the olefin monomer causes a polymer to be formed which has a boron-containing head group. Further, the polymer also has a functional end group, which is shown as the leaving group "A". Both the boron-containing headgroup and the leaving group are functional. Therefore, the polymer formed is a telechelic polymer. Also, since the end groups are dissimilar, the polymer is an asymmetric telechelic polymer.

Although the method of the invention is not limited to a specific reaction mechanism, it is believed that the presence of at least an equal stoichiometric amount of base to the amount of protic impurities, such as water, in the reaction mixture scavenges the protic impurities and thereby prevents these impurities from initiating other polymerizations. The presence of this proton scavenger also prevents chain transfer and termination, thereby causing the reaction to be a living polymerization. The resulting product has a well-defined structure and a controlled molecular weight. In addition, a relatively narrow molecular weight distribution, which is defined as the ratio of weight average molecular weight to the number average of polymer in the composition formed, can be achieved. In one embodiment, the molecular weight distribution is in a range of between about 1.01 and 2.00.

When the polymerization reaction is complete, such as by reacting all of the olefin monomer present in the reaction mixture, the resulting composition includes a polymer component which consists essentially of an asymmetric telechelic polymer having a boron-containing head group. Examples of such compositions include those wherein the asymmetric telechelic polymer component is polystyrene or polyisobutylene, having boron-containing head groups. The boron-containing head group has the following structural formula:

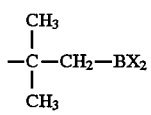

wherein "X" is a suitable substituent, such as a halogen. Suitable halogens include chlorine or bromine. Examples of other suitable substituents include hydroxy and methoxy functional groups. The polymer component can also contain a functionalized tail group with a carbon-heteroatom bond. An example of a suitable end group includes a halogen, wherein suitable halogens are chlorine or bromine.

Optionally, the asymmetric telechelic polymer product can be coupled to form a symmetric telechelic polymer. This method includes the steps of combining a coupling agent with the asymmetric telechelic polymer and then exposing the combined coupling agent and asymmetric telechelic polymer product to conditions which cause coupling of the polymer to form the symmetric telechelic polymer. Examples of suitable coupling agents include divinyl benzene, bis-trimethyl silyl ethylene, bis-trimethyl silyl cyclopentadiene, and other suitable related compounds.

When divinyl benzene is used as a coupling agent, the resulting symmetric telechelic polymer is as a star-shaped polymer. As defined herein, a "star-shaped polymer" includes three or more asymmetric telechelic polymers with boron-containing head groups bonded at the carbon formally connected to the end group to a central core of one or more divinyl benzenes. These bonded polymers are referred to as "arms." This coupling can be performed in situ subsequent to the polymerization described hereinabove by the addition of divinyl benzene and a suitable second Lewis acid. Examples of suitable second Lewis acids include $TiCl_4$, $SnCl_4$, $AlCl_3$, and $Al(alkyl)_x(halides)_y$, wherein x+y=3. In one embodiment, the concentration of the second Lewis acid is in a range of between about 0.005 and 0.3 molar. Preferably, the concentration is in a range of between about 0.01 and 0.1 molar.

In another embodiment, divinyl benzene can be employed as a coupling agent to form star-shaped polymers. For example, when divinyl benzene is present in a stoichiometric excess between about two- and five-fold that of the polymer present, star-shaped symmetric telechelic polymers can be formed. Preferably, the stoichiometric excess is between about five- and ten-fold.

The asymmetric and the symmetric telechelic polymer products can be further elaborated into other products. In one embodiment, the boron-containing end group reacts without cleavage of the carbon-boron bond. This method includes combining a asymmetric telechelic polymer, having a boron-containing head group, or a symmetric telechelic polymer, having boron-containing end groups, with a reagent which can react with the boron-containing head or end groups. The reaction mixture is then exposed to conditions which cause the reagent to react with the boron-containing head or end groups.

Examples of suitable reagents and methods are described in Pelter et al, *Borane Reagents*, Academic Press Limited (1988) and Brown, *Organic Synthesis Via Boranes*, John Wiley & Sons, New York (1975), the teachings of which are incorporated herein by reference. Examples include methanolysis and hydrolysis of the boron-containing end group(s). Other examples where the carbon-boron bond is cleaved include oxidation of the boron-containing end group(s). Still further examples include replacement of the boron-containing end group(s) with a heteroatom, hydrogen and a metal. Examples also include carbonylation along with other carbon-carbon bond forming reactions.

In a specific embodiment, a telechelic polymer with at least one boron-containing end group is contacted with a stoichiometric excess of methanol at a temperature in a range of between about –20° C. and –80° C., and preferably at a temperature in a range between about –35° C. and –45° C., to form a telechelic polymer with dimethoxyboron end group(s). In another specific embodiment, the boron-containing end group(s) is oxidized with hydrogen peroxide within a temperature range of between about 0° C. and 100°, and preferably in a temperature range of between about 25° and 70° C.

The invented polymers are useful in a wide range of applications, including base resins for adhesive formulations, compatibilizing agents for immiscible or poorly miscible thermoplastic polymers, impact modifiers for thermoplastic resins, for oil additives, and others.

The invention will now be further and more specifically described with regard to the following examples. All parts and percentages are by weight unless otherwise specified.

EXEMPLIFICATION

Example 1

Polymerization of Isobutylene and Styrene

A. Materials

Methyl chloride (MeCl) and isobutylene (IB) were dried by passing the gases through in-line gas purifier columns packed with BaO/Drierite and condensed in the cold bath of the glove box prior to polymerization. Styrene (99+% from Aldrich Chemical Co.) and divinylbenzene (80% mixture of isomers from Polyscience Chemical Co.) were purified by washing with 10% aqueous sodium hydroxide and then with distilled water until neutral. These reagents were dried over anhydrous magnesium sulfate and then distilled from calcium hydride under reduced pressure. Methylene chloride and 1,2-dichloroethane were washed with water, dried over $MgSO_4$ and stored over KOH. The dried methylene chloride and 1,2-dichloroethane were refluxed over $P_2O_5$ for 24 hours and distilled twice from fresh $P_2O_5$ just before use. n-hexane was refluxed for 24 hours with concentrated sulfuric acid, washed until neutral with distilled water, dried for 48 hours on molecular sieves, refluxed for 24 hours, and distilled from $CaH_2$ under nitrogen atmosphere. Boron trichloride (99.9+% by Aldrich Chemical Co.), 2,6-di-tert-butylpyridine (DTBP, 99.4% by Aldrich) Chemical Co.), 2,6-di-tert-butyl-4-methylpyridine (DTBMP, 99.5% by Aldrich Chemical Co.) and methanol (reagent grade), were used as received.

Isobutyldichloroborane was prepared by hydroboration of IB with $BCl_2H$-$SMe_2$ in pentane at room temperature using a procedure reported for the synthesis of n-octyldichloroborane (Braun et al., *J. Org. Chem.*, 45(3) :384 (1980). It was purified by distillation 94°–96° C. NMR: $^{11}B$: 67.47 ppm, $^{13}C$: 33.10 ppm, $^1H$: 0.88, 1.5, and 2.1 ppm, multiplet.

Methanolysis of this compound with excess methanol gave isobutyldimethoxyboron that was recovered following the removal of the solvent ($CH_3Cl$ or $CH_2Cl_2$), the excess methanol, and the hydrogen chloride generated. NMR: $^{11}B$: 31.34 ppm, $^{13}C$: 33.10 ppm, $^1H$: 3.69 ppm singlet, 1.85, 0.95, 0.74 ppm multiplet.

Trimethoxyboron was prepared in methylchloride at –40° C. from $BCl_3$ and methanol followed by evaporation of the solvent and HCl under dry $N_2$ atmosphere. $^{11}B$: 14.50 ppm (neat), 18.44 (r.mixt), NMR: $^{13}C$:50.76 ppm, $^1H$: 3.39 ppm.

B. Procedures

Polymerizations were carried out in a MBraun 150M stainless steel glove box (Innovative Technology, Inc.) equipped with a gas purification system (15 Lb molecular sieves and 11 LB copper catalyst, with automatic regeneration program) under dry nitrogen atmosphere ($H_2O$ and $O_2$ less than 1 ppm). The moisture content in the glove box was monitored by an MBraun moisture analyzer. Large (75 ml) test tubes were used as polymerization reactors. Total volume of the reaction mixture was 25 ml. The addition sequence of the reactants was as follows: solvent; proton trap (DTBP) (or base); monomer (IB and St); Lewis acid. After adding the last component, the reaction mixture was stirred vigorously by a vortex stirrer, and placed back into the temperature-controlled heptane bath. After predetermined time intervals, the polymerizations were terminated by adding prechilled methanol. The polymers were purified by repeated dissolution-precipitation in hexane/methanol and dried in vacuo prior to GPC measurements. Molecular weights were measured using a Waters HPLC system equipped with a Model 510 HPLC pump, a Model 410 differential refractometer, a Model 486 tunable UV/Vis detector, a multiangle laser light scattering detector, a Model 712 sample processor, and five ultrastyragel GPC columns connected in the following series: 500, $10^3$, $10^4$, $10^5$ and 100 Å. The flow rate (THF) was 1.0 mL/min. Narrow MWD PIB (polyisobutylene) samples were used as calibration standards. For data acquisition and computing a Waters Baseline chromatography workstation was used. $^1H$, $^{13}C$, and $^{11}B$ NMR measurements were carried out by a Bruker 270 MHz multinuclear spectroscope equipped with a temperature controller.

C. Results and Discussion

Methyl chloride, methylene chloride, 1,2-dichloroethane and mixtures of 1,2-dichloroethane/n-hexane were used as solvent for the polymerization of isobutylene initiated by $BCl_3$. The results are in Table I-4. For the polymerization of styrene initiated by $BCl_3$, methyl chloride, methylene chloride, and 1,2-dichloroethane were used as solvents. The results are in Table 5. Low molecular weight polymers with narrow molecular weight distributions were obtained in all solvents and all reactions and indicates living polymerization. The polymerization rate is strongly dependent on solvent polarity. The rate increased with increasing solvent polarity so that polymerization was slowest with methyl chloride and fastest with methylene chloride, 1,2-dichloroethane order. Adding n-hexane to 1,2-dichloroethane to the polymerization of isobutylene substantially reduced the rates and with the 40/60 v/v system no polymer formed in 2 hours.

TABLE 1

Polymerization of IB Using $CH_3Cl$

| Number of Samples | Reaction Time (hrs) | $Mn^1$ | $MWD^2$ | Conversion (%) |
|---|---|---|---|---|
| 1 | 2.5 | 926 | 1.35 | 1.5 |
| 2 | 5.0 | 1526 | 1.40 | 7.5 |
| 3 | 10 | 2728 | 1.38 | 37.3 |
| 4 | 20 | 3934 | 1.35 | 77.6 |

$[BCl_3] = 0.512M$, $[DTBP] = 4.7 \times 10^{-3}$ M, $[IB] = 0.938M$.
$-35°$ C.

TABLE 2

Polymerization of IB Using $CH_2Cl_2$

| Number of Samples | Reaction Time (min) | $Mn^1$ | $MWD^2$ | Conversion (%) |
|---|---|---|---|---|
| 1 | 10 | 806 | 1.26 | 1.5 |
| 2 | 30 | 2234 | 1.29 | 26.9 |
| 3 | 60 | 3181 | 1.30 | 79.8 |
| 4 | 120 | 3532 | 1.29 | 94.8 |

Temperature: $-40°$ C. other reaction conditions as in Table 1.
1. Weight average molecular weight
2. Ratio of weight average molecular weight to number average molecular weight.

TABLE 3

Polymerization of IB Using $ClCH_2CH_2Cl$

| Sample Number | Reaction Time (min) | $Mn^1$ | $MWD^2$ | Conversion (%) |
|---|---|---|---|---|
| 1 | 10 | 2306 | 1.24 | 41.5 |
| 2 | 20 | 2466 | 1.19 | 60.0 |
| 3 | 30 | 2494 | 1.18 | 66.5 |
| 4 | 40 | 2501 | 1.18 | 78.9 |
| 5 | 50 | 2540 | 1.17 | 82.5 |
| 6 | 120 | 2611 | 1.16 | 90.4 |

Temperature: $-25°$ C. other reaction conditions as in table 1

TABLE 4

Polymerization of IB Using $ClCH_2CH_2Cl$/n hexane

| Sample | $ClCH_2CH_2Cl$/hexane (v/v) | $Mn^1$ | $MWD^2$ | Conversion (%) |
|---|---|---|---|---|
| 1 | 90/10 | 2471 | 1.16 | 83 |
| 2 | 80/20 | 2249 | 1.25 | 54 |
| 3 | 40/60 | — | — | 0 |

Temperature: $-25°$ C.; polymerization time: 2 hours; other reaction conditions as in TABLE 1.
1. Weight average molecular weight
2. Ratio of weight average molecular weight to number average molecular weight.

TABLE 5

Polymerization of Styrene Using $BCl_3$

| Number of Sample | Reaction Time | Mn | Mw | MWD | Conversion (%) |
|---|---|---|---|---|---|
| Solvent: $CH_3Cl$ | | | | | |
| 1 | 30 | 386 | 1617 | 4.19 | 2.2 |
| 2 | 60 | 532 | 1536 | 2.89 | 9.9 |
| 3 | 150 | 878 | 1907 | 2.17 | 25.9 |
| 4 | 300 | 1900 | 3288 | 1.73 | 75.9 |
| 5 | 600 | 1819 | 2812 | 1.55 | 75.9 |
| Solvent: $CH_2Cl_2$ | | | | | |
| 1 | 5 | 358 | 538 | 1.50 | 5.7 |
| 2 | 20 | 606 | 881 | 1.46 | 43.1 |
| 3 | 40 | 990 | 1543 | 1.55 | 73.0 |
| 4 | 60 | 1129 | 1766 | 1.56 | 92.6 |
| 5 | 120 | 1608 | 2459 | 1.53 | 97.8 |
| Solvent: $ClCH_2CH_2Cl$ | | | | | |
| 1 | 10 | 1045 | 1814 | 1.74 | 76.9 |
| 2 | 20 | 1324 | 2166 | 1.64 | 93.8 |
| 3 | 30 | 1414 | 2248 | 1.59 | 100 |
| 4 | 40 | 1465 | 2296 | 1.57 | 100 |

$[BCl_3] = 0.512M$, $[DTBP] = 4.7 \times 10^{-3}$ M, $[St] = 0.699M$.

Increasing DTBP concentration does not affect the yields or the molecular weights (Table 6). This suggests that the only role of the DTBP is to trap protic impurities.

TABLE 6

Polymerization of IB at different DTBP Concentration

| Number of Sample | [DTBP] | Mn (M) | MWD | Conversion (%) |
|---|---|---|---|---|
| 1 | 4.7 × 10⁻³ | 2273 | 1.29 | 56.0 |
| 2 | 1 × 10⁻² | 2625 | 1.32 | 52.5 |
| 3 | 5 × 10⁻² | 2697 | 1.33 | 51.4 |

Solvent: $CH_2Cl_2$ temperature: −40° C. time: 45 min.

Representative PIB samples were characterized by $^1$H and $^{11}$B NMR. According to the $^1$H NMR spectrum the polymer is PIB-Cl with theoretical tert-chloro end-functionality. Chain end unsaturation is absent, which also proves the absence of chain transfer to monomer. $^1$H NMR of the polymer formed and quenched with MeOH reveals a peak at about 3.5 ppm, that can be attributed to the —B(OCH$_3$)$_2$ head group. The $^{11}$B NMR spectrum of this polymer shows a broad peak at ~32 ppm (BF$_3$ ether a internal reference) which can be assigned to a boron atom with two neighboring oxygens. It can be easily distinguished from the trimethoxyboron signal at 18 ppm, reaffirming that it is not due to traces of trimethoxyboron formed in the quenching with MeOH. The assignment was confirmed by $^{11}$B NMR of the isobutyldimethoxyboron model compound obtained by the methanolysis isobutylboron dichloride. When isobutyldimethoxyboron was added to this polymer solution, the peak of dimethoxyboron compound appears on the top of this broad peak.

The results of elemental analysis (Table 7) also corroborate the product structure:

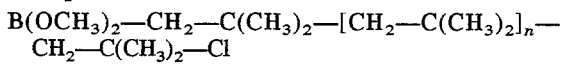

TABLE 7

Elemental Analysis (Galbraith Lab. Inc.)

| Element | Experimental (%) | Theoretical (Calculated from GPC M$_n$ = 2,000) (%) |
|---|---|---|
| B | 0.52 | 0.55 |
| O | 1.41 | 1.60 |
| Cl | 1.38 | 1.77 |

Example 2

Synthesis of Polyisobutylene with Hydroxyl Functionality

A 10 ml three-neck flask equipped with a magnetic stirring bar and a thermometer, was flushed with nitrogen. The flask was charged with 3.5×10⁻⁴M (1 g) of polyisobutylene having —B(OMe)$_2$ end-group and 15 ml of THF. After the polymer dissolved in THF, 4 mL of aqueous sodium hydroxide solution (2.5M) was added followed by the addition of 0.01M (1.02 ml) of 30% hydrogen peroxide. After the reaction the mixture was treated with 30 ml of hexane, and 20 ml of saturated aqueous potassium carbonate. The hexane extract was washed three times with distilled water and dried overnight on anhydrous sodium sulfate. The polyisobutylene was obtained after filtration and the evaporation of hexane.

For quantitative determination of the hydroxyl functionality by FTIR spectroscopy the free OH absorption at 3640 cm⁻¹ was used in conjunction with M$_n$ determined by vapor pressure osmometry. Quantiation was also carried out by $^1$H NMR using the peaks at 3.3 ppm and 1.92 ppm assigned to the methylene protons at the hydroxyl and chloro end group (HO—CH$_2$—PIB—CH$_2$—C(CH$_3$)$_2$—Cl). A series of reactions were carried out varying the reaction time and temperature. The results are shown in Table 8.

TABLE 8

| No. of Sample | Temperature | Time (hrs) | —OH Functionality by $^1$HNMR | by FTIR |
|---|---|---|---|---|
| 1 | 50° C. | 30 hrs | | 0.97 |
| 2 | room temperature | 48 hrs | 1.10 | |
| 3 | room temperature + reflux(65.5° C.) | 24 hrs 1 hrs | 1.09 | 1.09 |
| 4 | room temperature + reflux(65.5° C.) | 12 hrs 2 hrs | 0.95 | 1.01 |
| 5 | room temperature | 10 hrs | 1.08 | 1.06 |
| 6 | room temperature | 5 hrs | 1.01 | |
| 7 | room temperature | 1 hrs | 1.00 | |
| 8 | room temperature | 15 mins | 0.95 | 1.12 |
| 9 | room temperature | 5 mins | 0.62 | 0.59 |

Example 3

Synthesis of Star-Shaped Polymers

I. Star-Shaped Polymer of Isobutylene

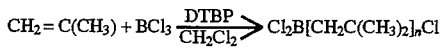

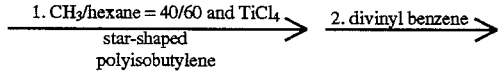

1. Star-Shaped Polyisobutylene Synthesis

To demonstrate the formation of star-shaped polymers by living cationic polymerization, the reaction of a living polymer of isobutylene and divinyl benzene (DVB) were studied. Isobutylene was polymerized using BCl$_3$ at −40° C. in dichloromethane, which led to a living polymer with a narrow molecular weight distribution (Mw/Mn<1.3), and a M$_n$~3600. Hexane was added to dissolve the PIB followed by TiCl$_4$ and DVB. The living polymer P$^+$ was then allowed to react with DVB.

When BBr$_3$ was used, molecular weights ~500 were obtained. Because the polymerization was rather slow with BBr$_3$ (4 hrs. polymerization time: conversion 40%, M$_n$=490 MWD=1.2, 20 hrs. polymerization time: conversion 64%, M$_n$=520, MWD=1.2) the unreacted monomer was evaporated after 4 hrs polymerization time. BCl$_3$ was then added and the mixture was cooled to −60° C. Finally DVB, was added. Tables 9, 10, and 11 show several parameters of the product obtained after varying reaction times.

TABLE 9

Star-shaped Polyisobutylene Obtained at Varying Reaction Times (Arm Chain Length: DP = 6)

| Reaction Time (min.) | $10^{-3}$ Mn (star) LS | GPC | $10^{-3}$ Mn (core) | f (arm No #) | Yield (%) |
| --- | --- | --- | --- | --- | --- |
| 0 | 0.34 | 0.35 | 0 | 0 | 0 |
| 10 | 12.24 | 1.06 | 8.38 | 11 | 97 |
| 30 | 12.35 | 1.45 | 8.57 | 11 | 98 |
| 60 | 13.24 | 1.58 | 9.00 | 12 | 99 |
| 4 × 60 | 18.02 | 1.88 | 12.51 | 16 | 100 |
| 14 × 60 | 18.09 | 1.91 | 12.56 | 16 | 100 |

Reaction condition: polymerization: $BBr_3/CH_2Cl_2/-40°C$. linking: $BC_3/CH_2Cl_2/-60°$ C., [DVB]/[P$^+$] = 7. f = average arm number.

TABLE 10

Star-shaped Polyisobutylene Obtained at Varying Reaction Times (Arm Chain Length: DP = 69)

| Reaction Time (min.) | $10^{-3}$ Mn (star) LS | GPC | MWD | $10^{-3}$ Mn (core) | f (arm No #) | Yield (%) |
| --- | --- | --- | --- | --- | --- | --- |
| 0 | 3.86 | 3.59 | 1.16 | 0 | 0 | 0 |
| 10 | 35.45 | 5.41 | 1.59 | 11.08 | 6 | 47 |
| 30 | 51.72 | 7.74 | 1.77 | 16.06 | 9 | 66 |
| 60 | 55.28 | 9.06 | 1.90 | 17.16 | 10 | 73 |
| 4 hrs | 72.98 | 14.26 | 2.87 | 22.66 | 13 | 86 |
| 14hrs | 360.50 | 104.82 | 3.81 | 111.93 | 64 | 92 |

Reaction condition: polymerization: $BBr_3/CH_2Cl_2/-40°$ C. linking: $CH_2Cl_2$/hexane 40/60 v/v, $TiCl_4$ [DVB]/[P$^+$] = 10.

TABLE 11

Star-shaped Polyisobutylene Obtained from Different Reaction Times

| DP (arm) | r | $10^{-3}$ Mn (star) LS | GPC | $10^{-3}$ MN (core) | f | Yield (%) |
| --- | --- | --- | --- | --- | --- | --- |
| 6 | 7 | 18.09 | 2.18 | 12.56 | 16 | 100 |
| 88 | 5 | 24.56 | 17.54 | 4.51 | 4 | 47 |
| 88 | 7 | 36.03 | 21.93 | 8.64 | 6 | 61 |
| 88 | 10 | 41.10 | 26.56 | 12.76 | 6 | 74 |
| 109 | 5 | 24.47 | 19.70 | 2.47 | 4 | 10 |
| 109 | 7 | 25.23 | 20.64 | 3.44 | 4 | 28 |
| 109 | 10 | 35.13 | 26.85 | 6.46 | 5 | 46 |

DVB, reaction time: 4 hours
DP = degree of polymerization of linear living polymer P$^+$;
r = [DVB]/[P$^+$], f = average arm number Equivalents Those skilled in the art will recognize, or be able to ascertain using no more than routine experimentation, many equivalents to specific embodiments of the invention described specifically herein. Such equivalents are intended to be encompassed in the scope of the following claims.

We claim:

1. A composition comprising a polymer component which consists essentially of an asymmetric telechelic polyolefin having a boron-containing head group covalently bonded to the polyolefin.

2. A composition of claim 1 wherein the polymer is polystyrene.

3. A composition of claim 1 wherein the polymer is polyisobutylene.

4. A composition of claim 3 wherein the polymer further includes a halogen-containing tail group.

5. A composition of claim 4 wherein the halogen of the halogen-containing tail group is chlorine.

6. A composition of claim 4 wherein the halogen of the halogen-containing tail group is bromine.

7. A composition of claim 4 wherein the boron-containing head group further includes a methoxy group.

8. A composition of claim 4 wherein the boron-containing head group further includes a hydroxy group.

9. A composition of claim 4 wherein the boron-containing head group further includes a halogen.

10. A composition of claim 9 wherein the halogen of the halogen-containing head group is chlorine.

11. A composition of claim 9 wherein the halogen of the halogen-containing head group is bromine.

12. A composition of claim 9 wherein the polymer has a molecule weight distribution in the range of between about 1.01 and 2.00.

13. A composition having a polymer component which consists essentially of a telechelic polyolefin including at least one boron-containing end group having a structural formula of:

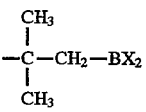

where "X" is a substituent.

14. A composition of claim 13 wherein the telechelic polymer is asymmetric.

15. A composition of claim 14 wherein the telechelic polymer is symmetric.

16. A composition of claim 15, wherein both end groups of the symmetric telechelic polymer are hydroxy groups.

17. A composition of claim 16 wherein the substituents at the boron-containing end groups include a methoxy group.

18. A composition of claim 16 wherein the substituents at the boron-containing end groups include a hydroxy group.

19. A composition of claim 16 wherein the substituents at the boron-containing end groups include a halogen.

20. A composition of claim 16, wherein the symmetric telechelic polymer is star-shaped.

21. A composition of claim 20, wherein the end groups of the star-shaped symmetric telechelic polymer are hydroxy groups.

22. A composition of claim 19 wherein the halogen of the boron-containing end groups is chlorine.

23. A composition of claim 19 wherein the halogen of the boron-containing end groups is bromine.

24. A composition of claim 19 wherein the molecular weight distribution of the polymer is in the range of between about 1.01 and 2.00.

25. A compound having the structure of:

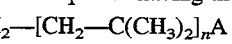

where n is at least one, X is a halogen, and A is a leaving group.

26. A compound of claim 25 wherein the leaving group is a halogen.

27. A compound of claim 26 wherein the leaving group is bromine.

28. A compound of claim 26 wherein the leaving group is chlorine.